2,967,841
Patented Jan. 10, 1961

2,967,841
PROCESS FOR IMPROVED DISPERSION OF PIGMENTS IN ENAMELS

Albert R. Hanke, Westfield, N.J., assignor to E. I. du Pont de Nemours and Company, Wilmington, Del., a corporation of Delaware No Drawing. Filed Mar. 25, 1957, Ser. No. 648,005

14 Claims. (Cl. 260—22)

This invention relates to the manufacture of improved enamel coating compositions which are substantially free from variations in color resulting from a variation in the method by which the coating composition is applied. The term "flocculation" is generally used in the art to describe these color variations.

Enamels made from phthalocyanine pigments, particularly those containing alkyd resins, may exhibit profound differences in color depending upon the method of application and the degree to which the film is disturbed during drying. These differences are frequently manifested in coatings applied by spraying and by dipping the same enamels. Thus, for example, in the automotive industry the main body of a car may be sprayed, whereas the fenders may be dipped prior to assembling. If such a procedure were used to apply a flocculating enamel, the sprayed body would show a much higher degree of color strength than the fender which had been dipped in an identically formulated coating composition. Another manifestation of the same problem is found in brush applications where, in lapping a freshly painted surface with a surface painted a short time previously, it is frequently observed that the brush strokes on the previously painted surface produce a considerably higher degree of color strength than the adjacent freshly painted surface. In either of these cases, the dissimilarity in color is very troublesome.

Numerous explanations of this tendency to show variations in color have been offered and prior to this invention, it has been rather generally accepted that the phenomenon is caused by simultaneously or separately occurring physical actions known as "flocculation" and "flooding." "Flocculation" refers to the formation of clusters of particles of the pigment, previously dispersed in the grinding operation and separable by relatively weak mechanical forces. It has been postulated that the passage of paint through the orifice of a spray gun tends to temporarily deflocculate the pigment, and in the case of a relatively rapid drying composition, the finish dries before complete reflocculation occurs. Thus, a sprayed portion of a film would exhibit a somewhat deflocculated state, whereas a dipped portion or a portion coated by pouring would exhibit the flocculated state. It has also been postulated that disturbance of a partially dried film (for example, brushing during the application of an adjacent surface) can cause breakdown of flocculated particles and that reflocculation cannot take place because of the set of the partially dried film. Thus, a rubbed or brushed portion would exhibit a higher degree of color strength than is exhibited by the undisturbed portion.

The second physical action which has been offered to explain color dissimilarity has been referred to above as "flooding." "Flooding" is a partial separation of co-dispersed pigments from each other in a drying paint film. In such a separation of the pigment, particles of one of the pigments float to the surface of the drying film. It can be demonstrated that this phenomenon frequently occurs during the evaporation of solvent from a paint film. For example, when a blue phthalocyanine pigment and a white pigment, such as titanium dioxide, are dispersed together in a paint film, it is possible for either of these pigments to float to the surface. Obviously, when the blue pigment comes to the surface, the film will appear darker or stronger. It is also obvious that the disturbance of the partially dried film as by brushing or rubbing would counteract this flooding effect and tend to restore the film to its original appearance.

It is generally accepted that "flooding" and "flocculation" usually occur simultaneously. However, the concept of flocculation has received more attention by those skilled in the art; and, as a result, a color variation caused by rebrushing or by the use of different methods of application has usually been known as "a flocculation effect" or simply as "flocculation" regardless of the actual cause or causes of the observed phenomenon.

It has now been discovered that there is a hitherto unrecognized cause of this color variation to which the name "agglomeration" has been applied, and the present invention relates to a method of overcoming "agglomeration." Agglomeration is present when a coating composition contains a significant amount of loosely bound pigment clusters which have not been dispersed to the desired degree by the conventional methods of preparing the coating composition. However, the internal cohesive forces in these agglomerates are sufficiently weak to permit them to break down irreversibly under a shearing force, such as that which results from the brushing of a partially dried film or from the passage of a coating composition through a zone of intense turbulence and shear. Films from coating compositions which have been subjected to such shearing forces will vary in shade from a film of the same composition which has not been subjected to these forces. It is generally considered that in those enamels which exhibit the color variations which have been referred to, agglomeration, flocculation and flooding all occur to some extent. However, it is now found that "agglomeration" can be overcome by the process of this invention in an enamel composition, and in cases where "agglomeration" is the predominating factor in causing a color variation, substantially all of this variation can be eliminated by the process of this invention.

The fact that agglomeration occurs in enamels containing flocculating pigments, such as a phthalocyanine, can be demonstrated by a study of the results of two test methods commonly applied in the industry. Both of these methods depend upon the behavior of a mixture of a phthalocyanine pigment and a white pigment, such as titanium dioxide (a commonly used ratio is 10 parts of phthalocyanine pigment and 90 parts of titanium dioxide) in an enamel coating composition. The first step in either test is to apply a film of the coating composition to a panel by spraying in a conventional manner. In one method of test, commonly called the "pour test," the sprayed film is allowed to become substantially dry, and then a small portion of the same enamel is poured over the top of the film and allowed to drain off. After further drying, a comparison is made between the sprayed portion of the film and the poured portion of the film.

In the other method of test, commonly called the "spray-rub test," the sprayed film is allowed to become partially dry, and then it is rubbed with a finger or with a dry rag, following which drying is allowed to continue. A comparison of the sprayed portion with the rubbed portion after final drying is used as the basis for the test.

In the first method of test as applied to a typical prior art enamel composition containing a phthalocyanine pigment, it is very common to observe that the poured portion of the film is appreciably weaker or lighter in color than the sprayed portion of the film. This is consistent with the concept of true flocculation, wherein the flocculates are temporarily broken up by the passage through the spraying orifice and do not completely reform during the drying. This lighter color in the poured portion is also consistent with the theory of flooding which postulates that the white pigment of the poured portion tends to more readily separate and come to the surface of the film. Furthermore, the appearance of a lighter color in the poured portion is also consistent with the new theory of agglomeration, in which the passage of the fluid through the spray orifice creates enough shear to break up some of the agglomerates. However, in the case of flocculation, and also of flooding, in which the results of the shearing action of the spraying orifice are temporary, it would be expected that, following the application of the sprayed film, there would be perceptible and progressive change in color. On the other hand, in the case of agglomeration which is irreversible there would be substantially no change after the film was applied. In actual tests on typical prior art phthalocyanine enamels, it has been found that very little color change does occur on the untouched sprayed film. This behavior leads to the conclusion that agglomeration is the predominating cause of the color variation.

In the case of the "spray-rub test," it is common to observe that the rubbed portion is darker or stronger than the sprayed portion, and this is likewise consistent with either true flocculation or with agglomeration. Since it has been found that substantially no change occurs in the untouched portion of the film, this test again indicates the predominance of agglomeration as the cause of the color difference in the rubbed portion.

It is, therefore, an object of this invention to overcome "agglomeration" in enamel coating compositions. It is a further object of this invention to prevent color variations due to rebrushing or using different methods of application of an enamel coating composition containing a pigment, such as a phthalocyanine pigment.

The objects of this invention are attained by preparing a dispersion of a pigment in an oleoresinous vehicle by conventional milling methods and then subjecting the milled material to an intense shearing action such as that created by a homogenizer. Preferred oleoresinous vehicle is an oil modified alkyd resin vehicle and a preferred pigment is a phthalocyanine pigment, such as a copper phthalocyanine or a polychloro copper phthalocyanine pigment. The manner of milling the pigment in the first step of the process may vary. For, example, one of the most commonly used methods, and a preferred one for this invention, is the grinding of a suitable mixture of pigment and vehicle, usually in the presence of a certain amount of solvent, in a ball mill until the desired degree of dispersion is obtained, followed by the addition of further vehicle and solvent to give a composition of the desired properties. Another method, also widely used, involves the passage of a suitable mixture of pigment, vehicle and solvent over a roller mill wherein the composition passes between sets of smooth rollers operating at different speeds to create a certain amount of shear at the point of closest contact. By the arrangement of suitable sets of rolls in series, or by the repeated passage of the composition through the same set of rolls, it is possible to submit the composition to any degree of grinding desired in such equipment. It would be expected that, in either of these methods of dispersing a pigment in a vehicle, additional work in the mill would reduce the degree of agglomeration which has been demonstrated to exist. However, it has been found that point is reached beyond which substantially no further dispersion of the pigment is obtained regardless of the length of time for which the composition is ground.

The present invention is particularly suitable for preparing enamel composition containing a phthalocyanine pigment. Such a pigment can be milled with an oleoresinous vehicle in a ball mill in a conventional manner.

For example, the pigment may be ground with a portion of the vehicle and solvent to give a satisfactory grinding consistency, and after the completion of the grinding, the remainder of the vehicle and solvent may be mixed to give the finished composition. Since the grinding characteristics of phthalocyanine pigments and white pigments are usually quite different, it is very common practice when preparing a tinted enamel to grind the pigments separately, each at its optimum grinding consistency, and then the two dispersions are mixed to form the final enamel. The formulation of such enamels to obtain desired properties is a well-known art, and the details of grinding the pigment-vehicle mixture may be varied widely. In the examples which follow, the methods used to obtain the initial dispersion of the pigment in the vehicle are typical of those which may be used in the trade, but they are not to be construed as limiting the invention.

The inventive feature of the process is the combination of the step of conventionally preparing the enamel dispersion and then passing the pigment vehicle mixture thus prepared (either immediately after grinding or after further dilution to a suitable consistency for application) through a zone of intense shearing action. The preferred means of applying this intense shearing action is to pass the paint through a homogenizer. This is a device containing a small orifice which is closed by a spring-loaded valve. When a fluid mass under sufficient pressure to open the valve is forced into the orifice, it will pass between the surface of the valve and the valve seat and will thus be subjected to intense shearing action. Around the opening which is created when the valve opens is an annular surface having a diameter which is just slightly larger than that of the opening. After the fluid mass under pressure passes through the valve opening, it impinges on this annular surface at approximately a right angle, thus serving to further break up pigment agglomerates. The pressure drop through this zone of intense shearing action should be between 1000–8000 p.s.i. A preferred range is 2000–8000 p.s.i. and a pressure drop of about 5000 p.s.i. normally produces optimum results. Such devices are conventional and well known, particularly in the art of preparing emulsions.

The following examples are for the purpose of illustrating the invention in detail. All parts are by weight unless otherwise specified.

EXAMPLE I

Part A

The pigment used in this example is a copper phthalocyanine pigment containing approximately 4% chlorine and obtained by the reaction of a mixture of 4-chlorophthalic acid and phthalic anhydride with urea and copper chloride in the presence of ammonium molybdate as a catalyst and kerosene as a liquid diluent. This pigment is isolated and prepared in a pigmentary state by grinding in acetone after the manner of U.S. Patent 2,556,727. An enamel composition is prepared from this pigment by grinding the following mixture in a suitable ball mill:

| | Parts |
|---|---|
| Copper phthalocyanine pigment | 16 |
| Alkyd resin—glyceryl phthalate resin modified with about 49% linseed oil—50% solution in mineral spirits | 42.5 |
| VM&P naphtha | 25.5 |
| Mineral spirits | 17.0 |

After grinding for about 72 hours, the following ingredients are added to the mill:

| | Parts |
|---|---|
| Alkyd resin—glyceryl phthalate resin modified with about 49% linseed oil—50% solution in mineral spirits | 78 |
| Lead and cobalt naphthenate drier in mineral spirits (approx. 10% total metal) | 2.8 |

The mixture is thoroughly stirred and separated from the grinding balls to give a full shade enamel of suitable consistency for handling and subsequent operations. In order to test the properties of this enamel, a tint is prepared by mixing:

| | Parts |
|---|---|
| Full shade enamel | 27.6 |
| White enamel based on the above alkyd resin (65.2% by weight) and containing 21.7% by weight of TiO$_2$ and 13.1% by weight of mixed solvent and drier | 100 |
| VM&P naphtha | 18 |
| Mineral spirits | 12 |

After suitable mixing, this light blue enamel is applied to a suitable metal panel by conventional spraying technique. After drying approximately 15 minutes, one end of this panel is rubbed with a moderate pressure. When the panel is completely dry, the portion which has been rubbed appears substantially darker or stronger than the portion which had not been disturbed after spraying. The light blue enamel made as above is typical of the prior art, and it was used as a control sample. This enamel contains the blue and the white pigments in a ratio of approximately 10 parts of blue to 90 parts of white.

EXAMPLE I

*Part B*

A full shade copper phthalocyanine enamel is made exactly as above and after separation from the grinding balls, the material is then passed twice through a Gaulin Pilot Plant Homogenizer so operated that the total pressure drop through the homogenizer is approximately 5000 lbs./sq. in. This homogenized enamel is then tested as described above by mixing with the white enamel in the same proportions and preparing a test panel (referred to as panel 2) by spraying the light blue enamel. This panel is tested by rubbing the partially dried film as described, and after final drying, it shows substantially no difference in color between the portion which is rubbed and the portion which is not rubbed. Furthermore, a comparison of this panel with the control shows that the rubbed portions of the two panels are substantially the same color, whereas the undisturbed portion of panel 2 is very much darker (stronger) than the undisturbed portion of the control panel. From the results, it is obvious that the enamel prepared according to this invention offers two advantages to the user; viz., (a) it eliminates the variations in color due to disturbances in the film during drying and (b) it offers a substantially improved value to the user because of its higher color strength.

EXAMPLE II

This example is substantially the same as Example I except that the pigment used is a copper phthalocyanine pigment substantially free of chlorine and prepared in the beta crystal phase after the manner of U.S. 2,556,726. The proportions of ingredients used are the same as in Example I, Part A (hereinafter referred to as Example IA), and the final panel made as described in Example IA shows substantially the same relative color between the rubbed portion and the sprayed portion, except that the difference in color between the sprayed and rubbed portion is considerably less than with the pigment used in Example IA. When a portion of the enamel as prepared in the instant example is passed through the homogenizer (before being mixed with the white enamel) and tested under the same conditions as used in Example I, Part B (hereinafter referred to as IB), the resulting panel is substantially free of any difference in color.

EXAMPLE III

This example is the same as Example I except that the copper phthalocyanine pigment used is a monochloro copper phthalocyanine pigment prepared by reacting phthalonitrile with cupric chloride at a temperature of about 200° C. The material thus obtained is converted to a pigmentary form by the well-known acid pasting method to give the monochloro copper phthalocyanine in alpha crystal phase. Normally, enamels made from this product are quite similar to those made from the product shown in Example IA except that they tend to be slightly greener in hue. Panels made from this enamel by the procedure shown in Example IA show the same relative difference between the rubbed and the sprayed portion of the panel, as is shown in that example. On the other hand, if a portion of this enamel is passed through a homogenizer under the conditions set forth in Example IB, and then tested in the manner described in Example IB, the panel will exhibit substantially no difference in color between the sprayed and the rubbed portion.

EXAMPLE IV

In this example, the pigment used is one which has been particularly troublesome in respect to this problem of giving wide variations in shade between the rubbed and the sprayed portion of the test panels. It is a phthalocyanine pigment which has been prepared directly in the pigmentary form by the reaction of 4-chloro-phthalic acid and phthalic anhydride with urea and cupric chloride in the presence of ammonium molybdate as a catalyst and in the presence of a suitable diluent liquid which is orthodichlorobenzene. Other solvents which may be used in place of orthodichlorobenzene include nitrobenzene o-nitrotoluene, trichlorobenzene and kerosene. The product is isolated by steam distillation to give a material which is in pigmentary form without further treatment but which exhibits certain unusual properties, in particular a considerably redder hue than has been previously found with monochloro copper phthalocyanine prepared by other methods. The above-described process is the subject matter of application Serial No. 486,888, filed February 8, 1955. When an enamel is prepared from this pigment by a process exactly similar to that of Example IA, the test panel shows a very wide difference in color between the sprayed and the rubbed portion. On the other hand, when this enamel is passed through the homogenizer under the conditions of Example IB prior to testing, the panel is substantially free from any difference in color between the sprayed and the rubbed portion. Moreover, the panel exhibits a color strength comparable to that of the enamel of Example IB, and it exhibits an appreciably redder and more intense hue.

EXAMPLE V

It is frequently said that enamels made from polychloro copper phthalocyanine (copper phthalocyanine green) are free from the tendency to exhibit differences in color between the sprayed and the rubbed portions of panels made therefrom. However, this is not always true, and under some conditions, variations in color will appear. Accordingly, a panel is prepared as in Example IA except that polychloro copper phthalocyanine is used as the pigment. When the test panel is examined, some difference in color between the rubbed and the sprayed portion is apparent. However, when the same enamel is passed through the homogenizer under the conditions of Example IB, no difference in color is observed between the sprayed and the rubbed portion of a test panel.

EXAMPLE VI

In Example IB, the homogenization is applied to the diluted mill base which could be spoken of as the full shade enamel. In the instant example, the homogenization is applied at various points in the process.

A. Homogenization is applied to the mill base prior to dilution with solvent, and the properties are found to be substantially the same as obtained by homogenization of the somewhat less viscous full shade enamel. On a large plant scale with suitable pumps for handling liquids of high viscosity, it is entirely possible to carry out the homogenization at this stage, and the ability to pass a considerably smaller volume of liquid through the homogenizer makes the process more economical to operate.

B. The tinted enamel comprising the mixture of the blue enamel and the white TiO₂ enamel is prepared prior to homogenization, and the mixture is passed through the homogenizer to give a product which is in every respect equal to that of Example IB.

EXAMPLE VII

Portions of the enamels prepared as in Example IB, both the full shade enamel and the light shade tint enamel, were examined after standing for approximately one year. Fresh panels were prepared from both the full shade enamel newly diluted with a fresh white enamel and from the tint enamel as previously prepared. These new panels compared favorably in every respect with the panels prepared when the enamels were first made. There was no evidence of any reagglomeration of the pigment either in the full shade enamel or in the tint so that the panels prepared at the later date were substantially exact matches of the original panels. This is a particularly important achievement with phthalocyanine pigments because heretofore enamels which have stood for many months frequently do not exhibit the same color as they did when they were freshly prepared.

All of the pigments shown in the above examples are copper phthalocyanine pigments, these being the only phthalocyanine products which have achieved any widespread commercial application. However, it is well known that a metal-free variety can be obtained and that it exhibits the same defects with respect to color variation as have been exhibited by the copper phthalocyanine pigments. It is also well known that other metal phthalocyanines, such as for example, nickel phthalocyanine, cobalt phthalocyanine, zinc phthalocyanine and aluminum phthalocyanine can be prepared and that they also exhibit this defect of color variation. It has been found that, with each of these pigments, the color variation phenomenon is capable of being divided into the three different phases previously discussed and that the difficulties due to agglomeration can be overcome by the use of the homogenizer when applied to the enamel coating compositions in exactly the same manner as has been shown with respect to copper phthalocyanine. It is, of course, possible to obtain both copper phthalocyanine and these other metal phthalocyanines with varying degrees of chlorine content, or for that matter, other substituents, and it is intended that this invention shall cover all such products.

It is well known in the preparation of enamel coating compositions that a great variety of resins may be used in their preparation. The great majority of resins commonly used today are oil-modified alkyd resins prepared from an aromatic dibasic acid or anhydride (such as phthalic anhydride, isophthalic acid and terephthalic acid), a polyhydroxy alcohol (such as glycol, glycerol, pentaerythritol) and a drying or semi-drying oil such as linseed oil, soya bean oil and hydrogenated castor oil. These resins are commonly used in the form of solutions in such solvents as the mixture of VM&P naphtha and mineral spirits shown in Example I as well as in many other types of solvent mixtures. Other enamel vehicles with which this invention is effective include bodied linseed oil, alkyd resins modified with melamine and other amine resins, and the oil-modified phenolic resins. It is not intended to restrict this invention to any particular enamel vehicle since the claimed process is applicable to any oleoresinous enamel containing pigment agglomerates which are not completely dispersed in the conventional milling operation, thus making an applied film of the enamel susceptible to a color variation when different methods of application are used.

The proportions of ingredients used in preparing enamel compositions may vary widely depending upon the properties desired in the final composition. The selection of these proportions is within the skill of one versed in the art of enamel manufacture and bears no relation to the inventive features of this discovery. It has been pointed out in the examples that the homogenization step can take place with the very viscous mill base directly from the mill, or it can be done on the thinned-out full shade enamel, or equally as well, on the final composition just prior to application.

In line with the very common practice in the industry, the examples have shown the original dispersion of the pigment in the vehicle as taking place in a ball mill. However, it is not necessary that these enamels be prepared in ball mills because many other methods of dispersing pigments in vehicles are known and are quite successfully used. For instance, a suitable mixture of pigment and an oleoresinous vehicle and additional thinner may be dispersed by a roller mill. Such pieces of equipment offer advantages in the rate of production, but they offer disadvantages in the difficulty of eliminating losses of solvent during the operation. It would appear that the degree of shear in the homogenizer should be sufficient to result in a dispersion of the pigment in one operation. However, experience has indicated that this is not true and that the usual pigment particles are not completely dispersed in a vehicle if the homogenizer is used alone. Hence, it seems to be necessary to have a preliminary dispersion in the ball mill or other device of similar characteristics prior to the passage of the enamel through the homogenizer.

Although the invention up to this point has been applied specifically to enamel coating compositions containing phthalocyanine pigments as the pigmenting ingredients, it is also applicable to other compositions which exhibit the same phenomenon of agglomeration. In particular, certain dioxazine pigments have exhibited an effect in coating compositions which is similar to that shown by phthalocyanine pigments. One such pigment is 6,13-dichloro-2, 9-diphenyl-triphendioxazine which has been disclosed in British Patent 646,099, of November 15, 1950. It is now found that a typical coating composition made substantially according to Example IA but containing this dioxazine pigment is subject to very severe agglomeration; whereas, this composition, after passing through a homogenizer according to the process described above, is substantially free from agglomeration. Moreover, the dioxazine pigment acts similarly to the phthalocyanine pigments in that it shows a markedly improved color strength in a coating composition extended with titanium dioxide. It is also contemplated that coating compositions containing other pigments and which show this same phenomenon of incomplete dispersion will be markedly improved by the passage of the compositions through the homogenizer in the manner described above for phthalocyanine pigments.

The construction of homogenizers for the type of action contemplated in this invention is rather well known and conventional, and such equipment is made by a number of manufacturers. The preferred device shown above for creating the zone of intense shearing action necessary for the improvement brought about by this invention is a pressure homogenizer which has already been described. Although the details of construction may vary, there are two essential features:

(1) Passage of the liquid through a very restricted orifice with a very high pressure drop.

(2) Impingement of this high velocity stream on a surface more or less at right angles to the stream.

The principal variable in the operation of such a device is the pressure drop across the orifice. The examples have shown working under a pressure of about 5,000 pounds per square inch (p.s.i.). Although this is a preferred pressure, it is known that lower pressures are effective if the composition is given additional treatment by repeated passes through the device. However, pressures below about 1,000 p.s.i. are relatively ineffective regardless of the number of passes through the device. Pressures higher than 5,000 p.s.i. may be used; but they are unnecessary, uneconomical, and difficult to obtain. Therefore, the invention is contemplated as requiring a pressure drop of at least 1,000 p.s.i. and as having a preferred range of about 2,000–8,000 p.s.i. A single pass effects a great improvement, but maximum improvement appears to require from 2 to 4 passes through such equipment.

By the addition of one relatively simple step of passing an enamel composition prepared in a conventional manner through a homogenizer, the troublesome variations in color during application (due to agglomeration and commonly observed with phthalocyanine and dioxazine pigments) are substantially eliminated. Furthermore, the remarkable improvement in dispersion of the pigment which is brought about by the process results in a corresponding improvement in color strength and in the economic value of the pigment. Moreover, these improvements are accomplished without the addition of any foreign material to the pigment or to the paint composition.

Since it is obvious that many changes and modifications can be made in the above-described details without departing from the nature and spirit of the invention, it is to be understood that the invention is not to be limited to said details except as set forth in the appended claims.

I claim:

1. In a process for preparing an enamel coating composition by milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises passing the milled material through a homogenizer.

2. In a process for preparing an enamel coating composition by ball milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises passing the ball milled material through a homogenizer.

3. In a process for preparing an enamel coating composition by milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises passing the milled material through an orifice created by the opening of a spring loaded valve and across which the pressure drop is at least 1000 pounds per square inch, and impinging the mixture emerging from the orifice on a surface which is at substantially right angles to the orifice.

4. In a process for preparing an enamel coating composition by milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises passing the milled material through an orifice created by the opening of a spring loaded valve and across which the pressure drop is 2000–8000 pounds per square inch, and impinging the mixture emerging from the orifice on a surface which is at substantially right angles to the orifice.

5. In a process for preparing an enamel coating composition by milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises passing the milled material through an orifice which is created by the opening of a spring loaded valve and across which the pressure drop is about 5000 pounds per square inch, and impinging the mixture emerging from the orifice on a surface which is at substantially right angles to the orifice.

6. In a process for preparing an enamel coating composition by milling an oil-modified alkyd resin vehicle and a pigment, selected from the group consisting of phthalocyanine and dioxazine pigments said pigment being one which is agglomerated in said vehicle to the extent that it is the predominating cause of color variation in the enamel composition upon using different methods of applying said composition, the improvement which comprises milling a mixture comprising a pigment and an oleoresinous vehicle and then passing the milled material through a homogenizer from 2 to 4 times.

7. The process of claim 1 in which the pigment is a dioxazine pigment.

8. The process of claim 1 in which the pigment is a phthalocyanine pigment.

9. The process of claim 8 in which the pigment is a copper phthalocyanine pigment containing about 4% chlorine.

10. The process of claim 8 in which the pigment is a monochloro copper phthalocyanine pigment.

11. The process of claim 8 in which the pigment is a substantially chlorine-free copper phthalocyanine pigment.

12. The process of claim 8 in which the pigment is a polychloro copper phthalocyanine pigment.

13. The process of claim 2 in which the pigment is a copper phthalocyanine.

14. The process of claim 5 in which the pigment is a phthalocyanine pigment.

References Cited in the file of this patent

UNITED STATES PATENTS

| | | |
|---|---|---|
| 2,116,380 | Bauer | May 3, 1938 |
| 2,384,270 | Balassa | Sept. 4, 1945 |
| 2,597,422 | Wood | May 20, 1952 |